United States Patent
Scherl et al.

(10) Patent No.: US 8,263,113 B2
(45) Date of Patent: Sep. 11, 2012

(54) METHOD FOR INCREASING THE SHELF LIFE OF A PHYSICALLY DISCRETE DRY PET FOOD COMPOSITION

(75) Inventors: Dale Scott Scherl, Lawrence, KS (US); Chadwick Everett Dodd, Lawrence, KS (US); Fernando Qvyjt, Topeka, KS (US)

(73) Assignee: Hill's Pet Nutrition, Inc., Topeka, KS (US)

( * ) Notice: Subject to any disclaimer, the term of this patent is extended or adjusted under 35 U.S.C. 154(b) by 131 days.

(21) Appl. No.: 12/271,959

(22) Filed: Nov. 17, 2008

(65) Prior Publication Data

US 2009/0074827 A1 Mar. 19, 2009

Related U.S. Application Data

(62) Division of application No. 10/979,757, filed on Nov. 3, 2004.

(60) Provisional application No. 60/516,914, filed on Nov. 3, 2003.

(51) Int. Cl.
*A23K 1/17* (2006.01)
*A21D 4/00* (2006.01)

(52) U.S. Cl. ........................................ 424/442; 426/321

(58) Field of Classification Search ................... None
See application file for complete search history.

(56) References Cited

U.S. PATENT DOCUMENTS

| | | | |
|---|---|---|---|
| 2,877,115 A * | 3/1959 | Wemyss, Jr. et al. | ......... 162/179 |
| 3,808,341 A | 4/1974 | Rongey et al. | |
| 3,930,031 A | 12/1975 | Kealy | |
| 4,508,741 A | 4/1985 | Corbett et al. | |
| 4,822,626 A * | 4/1989 | Spanier et al. | ................... 426/94 |
| 5,011,679 A | 4/1991 | Spanier et al. | |
| 5,418,010 A | 5/1995 | Janda et al. | |
| 5,531,994 A | 7/1996 | Schmidt et al. | |
| 5,532,010 A * | 7/1996 | Spanier et al. | ................... 426/94 |
| 5,690,988 A | 11/1997 | Lin et al. | |
| 5,968,569 A | 10/1999 | Cavadini et al. | |
| 6,383,529 B2 | 5/2002 | Davenport et al. | |
| 6,419,903 B1 | 7/2002 | Xu et al. | |
| 7,025,983 B2 | 4/2006 | Leung et al. | |
| 2002/0034549 A1* | 3/2002 | Becker et al. | .................. 424/489 |
| 2002/0041923 A1* | 4/2002 | Huang et al. | ................... 426/549 |
| 2003/0091668 A1 | 5/2003 | Davenport et al. | |
| 2006/0068019 A1 | 3/2006 | Dalziel et al. | |

FOREIGN PATENT DOCUMENTS

| | | |
|---|---|---|
| EP | 0 862 863 A2 | 9/1998 |
| WO | 0010405 A | 3/2000 |
| WO | WO 01/25414 | 4/2001 |
| WO | 02052951 A | 7/2002 |

OTHER PUBLICATIONS

European Search Report dated Sep. 26, 2008.
Surelease Aqueous Ethylcellulose Dispersions product description. Accessed online at http://www.colorcon.com/products/coatings/extended-release/surelease/product%20overview on Aug. 13, 2010.

* cited by examiner

*Primary Examiner* — Carlos Azpuru
*Assistant Examiner* — Casey Hagopian
(74) *Attorney, Agent, or Firm* — Michael F. Morgan

(57) ABSTRACT

A composition comprising a physically discrete pet food oral intake composition coated with a physically stable film, the film comprising a component which is a) capable of carrying a beneficial agent to a site in the pet wherein the benefit agent is effective in producing a beneficial effect or b) capable of releasing the benefit agent into the mouth or alimentary canal with the benefit agent traveling to a site in the pet wherein the benefit agent is effective in producing a beneficial effect.

6 Claims, No Drawings

METHOD FOR INCREASING THE SHELF LIFE OF A PHYSICALLY DISCRETE DRY PET FOOD COMPOSITION

CROSS-REFERENCE TO RELATED APPLICATION

This application is a divisional of U.S. patent application Ser. No. 10/979,757 filed Nov. 3, 2004 which is a non-provisional of U.S. Provisional Application No. 60/516,914, filed on Nov. 3, 2003, the contents of which are incorporated herein by reference in their entirety for all purposes.

BACKGROUND OF THE INVENTION

Pet food compositions must be sufficiently palatable to be consumed by the pet. Besides its ordinary nutritional value after consumption pet food compositions have been used in an attempt to deliver to the pet beneficial agents such as medicaments, prebiotics, probiotics and the like. These are oftentimes disguised or hidden in the pet food, for example in a "two-in-one" kibble having a different textured center core surrounded by an outside shell wherein the center core caries the benefit agent.

We have recently discovered a different type of technology which can utilize the external portion of the discrete pet food composition such as a kibble, solid, treat or supplements or even a "chunk" in a canned food "chunk and gravy" diet as a carrier for the benefit agent. However the benefit agent is not applied directly to the surface of the discrete portion of the pet food composition. Rather, the benefit agent is delivered to the solid surface in the matrix of a film which is physically stable and capable of being expressed on the surface of the physically discrete portion of the pet food composition. In one embodiment, this film is a rapidly dissolving polymer in the oral cavity, particularly in the presence of saliva. In a further embodiment, the film is a material which stays intact or essentially intact until the benefit agent is delivered to the site where it can be effective for example the stomach, small intestine or large intestine. In a still further embodiment the thin film rapidly or fairly rapidly dissolves but the benefit agent can be coated with a different component which allows the benefit agent to be carried further into the alimentary canal, such as the small or large intestine where the coating, if present, dissolves and releases the benefit agent for its activity.

SUMMARY OF THE INVENTION

In accordance with the invention there is a composition comprising a physically discrete pet food oral intake composition coated with a physically stable film, the film comprising a component which is a) capable of (or for) carrying a beneficial agent to a site in the pet wherein the benefit agent is effective in producing a beneficial effect or b) capable of (or for) releasing the benefit agent into the mouth or alimentary canal with the benefit agent traveling to a site in the pet wherein the benefit agent is effective in producing a beneficial effect.

A further aspect of the invention is the method of suppressing one or more odors emanating from a physically discrete pet food composition, said odor negatively affecting the palatability of said food composition, comprising coating the physically discrete pet food composition with a physically stable odor suppressant film which rapidly dissolves in the oral cavity of the pet.

A still further aspect of the invention is wherein the composition has an extended shelf due to the film and/or the agent therein. The film and/or the agent therein protects the composition in a manner such as protection from oxidation and/or bacterial growth so as to extend the shelf life of the composition. These and other aspects of the invention will become clear to one of ordinary skill in the art as the invention(s) are further described.

DETAILED DESCRIPTION OF THE INVENTION

The pet food composition which can be employed in carrying out the invention is the usual, physically discrete portion of the pet food. For example these include a dry pet food comprising kibbles, bits, any other discrete materials, solid treat, supplements and the like, and even "chunks" in a chunk and gravy wet diet assuming the film can be properly applied to the chunk in the food processing and remain stable in the liquid environment of the container.

By coating the surface is meant that at least enough of the surface of the discrete particle is covered with the film so as to achieve the desired effect. The entire surface need not be coated. For certain aspects such as delivering a benefit agent the coated surface need only be minimum of about 10% of the surface area, preferably about 20%. However in order to attenuate particle malodor a substantial amount of the surface area should be coated, for example at least about 75%, preferably at least about 85% and most preferably 95-100%.

The process of applying the polymer to the surface of the physically discrete pet food can be done through any of the common procedures known to be effective in applying films to objects. These procedures include casting, spraying, grafting sputtering, flowing, calendaring, extruding and the like. It can be done to the pet food composition prior to being cut into physical discrete portion but is preferably done after the physically discrete portions are formed, thus ensuring an even distribution on the entire particle, if so desired.

The chemical used in coating the pet food is a polymer which should be physically stable during the process of its application and also stable during its lifetime on the pet food composition surface while being subjected to any further processing steps. It should remain essentially chemically inert with the surface, itself or its environment but can be somewhat reactive as long as its function in the system is not significant jeopardized. Its compatibility with the oral cavity and digestive tract of the pet should also be present. Examples of these polymers include zein, casein, starch(es), cellulose(s), gum(s), gelatin, starch/synthetic polymer(s), e.g starch/low density polyethylene, and the like. The polymer preferably has the attribute of rapid dissociation in the oral cavity, particularly in the presence of saliva. The thickness of the coating is not as important. It can vary from about 1 to about 2000 microns, or from about 2 to about 1000 microns, as long as the function of the film is maintained.

The film can be present on the discrete particle with no benefit agent therein or with a benefit agent within the film matrix. The benefit agent can be totally soluble within the film or partly soluble within the film matrix and the remainder suspended therein. When the matrix rapidly dissolves, this can be in a matter of about 1-10, preferably about 1-5 and more preferably about 1-2 seconds. After exposure to the oral cavity and the saliva therein, these times are within the normal residence time of pet food in the pet's oral cavity. The film dissolves releasing the benefit agent for action in the oral cavity or further in the digestive tract including systemic absorption where appropriate and dependent upon the specific benefit agent.

Where it is not important that the film rapidly dissolve in the oral cavity, other film components can be employed, for example PVA, polysaccharides, and PE-starch. These materials are slower to dissolve and can release a benefit agent, if present, further down the alimentary canal for example the stomach or small intestine. Additionally if the benefit agent needs to be protected from the environment it is to reach the point where it can be effectively released. The benefit agent can be "coated" prior to its incorporation into the film making component. An example of such a coating is an enteric coating such as a polysaccharide, cellulose, methacrylate, and commercially available coating such as Eudragit™.

Examples of benefit agent(s) include the following

Proteins: Enzymes, Microbials, Immunoglobulins, Immune modulators

Polysaccharides: Starches, Celluloses, Gums, Extracts

Sugars

Lipids: Phospholipids, Fatty acids

Polypeptides: Gelatin

Minerals/Vitamins

Flavoring agents

Polymer composites: starch/(synthetic polymers) [e.g. starch—LDPE] (low density polyethylene)

Actives—could be defined by any number of constituents

Medications: Antimicrobials, Antiinflammatories, Prebiotics,

Hormones, and the like

Ectoparasiticides

Botanicals/extracts

Fungicides

As shown above, a benefit agent as used in the application is any material which can provide a benefit to the mammal ingesting it.

Below are examples of the invention.

EXAMPLE 1

A typical diet is extruded and cut into kibble. It is cooled off to 18-15° C. Then it is sprayed with a starch such as cornstarch providing a coating which covers or essentially (95-100%) covers the surface. Such coating can suppress any malodor(s) such as fish oil from the kibble, thereby increasing the palatability of the kibble. The coating rapidly dissolves in the oral cavity of the pet, for example a dog or cat, eating the kibble.

EXAMPLE 2

The kibble of Example 1 is alternatively sprayed with one of a group consisting of zein, casein, cellulose, gum, gelatin, starch/synthetic polymer and a mixture thereof and similar results are obtained.

EXAMPLE 3

The coating of Examples 1 and 2 are applied by a process of sputtering, grafting, casting, blowing, extruding or calendaring. Similar results are obtained as in Example 1.

EXAMPLE 4

A benefit agent to be effective through absorption in the mouth, a zinc salt, is suspended in a zein solution and sprayed on a dog diet which has been cut in kibbles. The diet is ingested by the dog and the zinc salt released in the mouth after the film is dissolved. The zinc salt is now available for its activity in the mouth.

EXAMPLE 5

A benefit agent such as a probiotic which is inactivated in the stomach, is coated with cellulose. The coated probiotic is suspended in casein and sprayed onto a dog diet which has been cut into kibbles. The diet is ingested by the dog and the coated probiotic released in the mouth after the film has dissolved. The coated probiotic makes its way down the alimentary canal until it reaches the small intestine wherein the cellulose coating breaks down and the probiotic is absorbed into the small intestine.

The invention claimed is:

1. A method for increasing the shelf life of a physically discrete dry pet food composition comprising coating the physically discrete pet food composition with a polymer film, wherein the film or an agent in the film protects the composition from oxidation decomposition and/or protects the composition from bacterial growth, and wherein the film comprises a starch/synthetic polymer selected from the group consisting of starch/polyethylene, and starch/low-density polyethylene.

2. The method of claim 1 wherein the polymer film further comprises a polymer selected from zein, casein, starch(es), cellulose(es), gum(s), gelatin, and combinations thereof.

3. The method of claim 1 wherein the polymer film contains an agent which protects the composition from oxidation decomposition and/or protects the composition from bacterial growth.

4. The method of claim 1 wherein the thickness of the polymer film is between 1 and 2000 microns.

5. The method of claim 1, wherein the starch/synthetic polymer is a starch/low-density polyethylene polymer.

6. The method of claim 5 wherein the polymer film rapidly dissolves in the oral cavity of the pet.

* * * * *